Sept. 17, 1968     B. J. LAZAN     3,401,911

ADJUSTABLE VISCOELASTIC VIBRATION ENERGY DISSIPATOR

Filed Dec. 13, 1966     2 Sheets-Sheet 1

INVENTOR
BENJAMIN J. LAZAN, DECEASED,
BY JEANNETTE W. LAZAN
SPECIAL ADMINISTRATRIX
BY Harry A. Herbert Jr
ATTORNEY Richard J. Killore
AGENT INVENTOR
BENJAMIN J. LAZAN, DECEASED,
BY JEANNETTE W. LAZAN
SPECIAL ADMINISTRATRIX.
BY Harry A. Herbert Jr.
ATTORNEY
Richard J. Killoran
AGENT

United States Patent Office 3,401,911
Patented Sept. 17, 1968

3,401,911
ADJUSTABLE VISCOELASTIC VIBRATION
ENERGY DISSIPATOR
Benjamin J. Lazan, deceased, late of St. Paul, Minn., by Jeannette W. Lazan, special administratrix, St. Paul, Minn., assignor to the United States of America as represented by the Secretary of the Air Force
Filed Dec. 13, 1966, Ser. No. 603,706
5 Claims. (Cl. 248—358)

ABSTRACT OF THE DISCLOSURE

A vibration energy dissipator having an inertial mass secured to a support through a viscoelastic material is adjustable to change the natural frequency of the system. The natural frequency of the energy dissipator is adjusted either by changing the position of the inertial mass of a pendulum or by changing the tension is a wire supporting an inertial mass.

This invention relates to an adjustable viscoelastic vibration energy dissipator.

One object of the invention is to provide a vibration energy dissipation device which is capable of having its natural frequencies adjusted.

Another object of the invention is to provide a vibration energy dissipating device wherein the natural frequencies are readily adjusted in the field.

Brief summary of the invention

A shaft, having a ball on one end, has an inertial mass threadably supported thereon. A support body member adapted to be secured to the vibrating structure has a spherical cavity. A spherical shaped viscoelastic material having a spherical shaped cavity is secured in the cavity on the support body structure. The ball on the shaft is secured in the spherical shaped cavity in said viscoelastic material. In another embodiment, the inertial mass is supported on a wire attached to a pin supported by a viscoelastic material. An adjustable spring is attached to the other end of the pin.

These and other objects will be more fully understood from the following detailed description taken with the drawing, wherein.

Damped dynamic absorbers or vibration dampers have been studied by numerous investigators throughout the years. Recent investigations have refined these analyses by introducing other ways of mathematically representing damping in a dynamic absorber that utilizes a spring made from rubber-like or viscoelastic materials which both store and dissipate energy. These investigations have generally concerned themselves with constructing dampers tuned to damp a single troublesome resonance in the vibrating structure. However, no means was provided for adjusting the damping frequency to make the device readily usable on various structures.

According to this invention, an adjustable viscoelastic vibration energy dissipator is provided by simply adjusting the tension of a spring or the position of a mass in a particular configuration.

Figure 1:
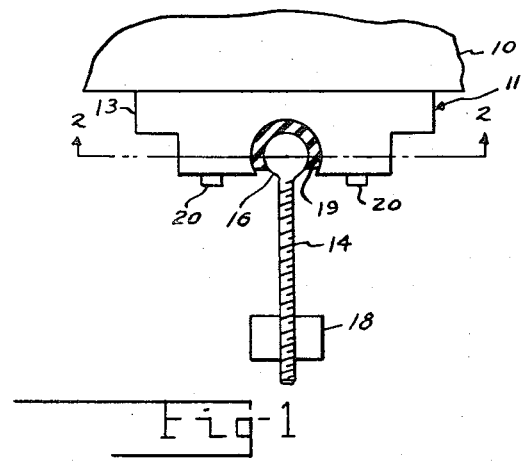
FIG. 1 is an adjustable vibration energy dissipating device according to one embodiment of the invention in its unstrained conditions.
Figure 2:
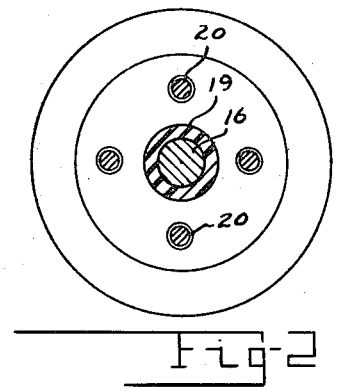
FIG. 2 is a sectional view of the device of FIG. 1 along the line 2—2.
Figure 3:
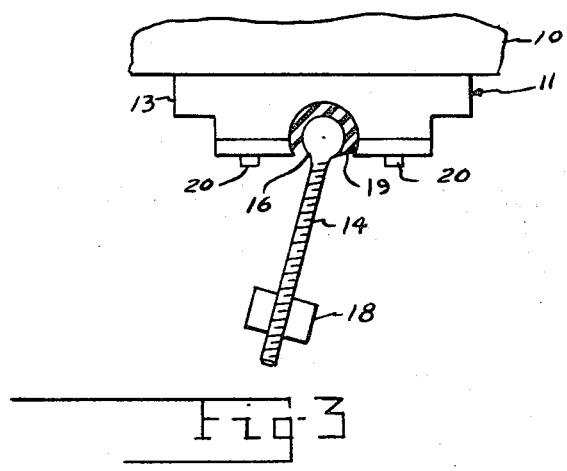
FIG. 3 shows the device of FIG. 1 in its strained condition.

Reference is now made to FIG. 1 of the drawing which shows a structure 10 which is to be damped.

A vibration dissipating device 11 has a support body member 13 and a shaft member 14 with a ball 16 at one end and which is threaded at the other end to receive an inertial mass member 18. The ball 16 is secured within a hollow, partially spherical-shaped energy absorber element 19 made of any of the well-known viscoelastic materials such as unvulcanized butyl rubber or black, hard rubber. The energy absorber element 19 is secured to the body member 13 and the ball 16 by means of an adhesive. The body member 13 is shown as being made of two pieces to make it easier to manufacture. The member 13 is secured to the structure 10 by means of four bolts 20.

In the operation of the device, the dissipating device 11 is secured to the structure to be damped. The position of the mass is then adjusted until the vibrations are at a minimum. If troublesome resonance later exceeds the desired level, the position of the mass can again be adjusted or additional damping devices may be added to the structure. With plural devices used, they can be set to damp different vibration frequencies.

Figure 4:
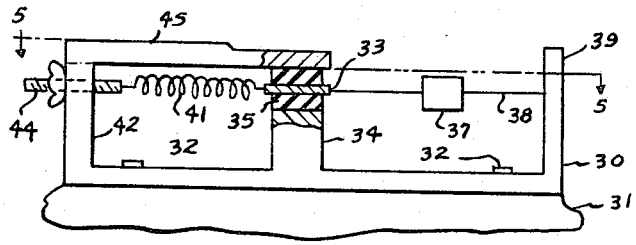
FIG. 4 is a partially cutaway view of an adjustable vibration energy dissipating device according to another embodiment of the invention, in its unstrained condition.
Figure 5:
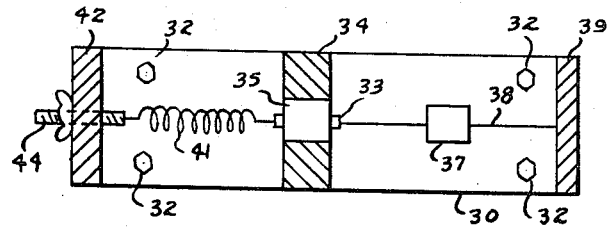
FIG. 5 is a sectional view of the device of FIG. 4 along the line 5—5.
Figure 6:
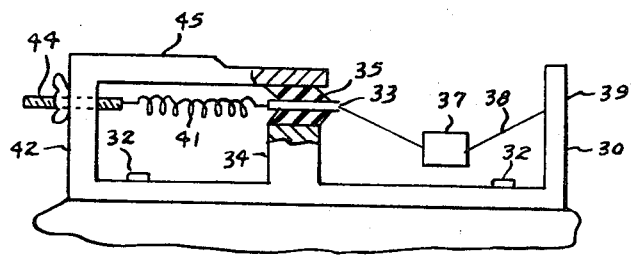
FIG. 6 is a partially cutaway side view of the device of FIG. 4 in its strained condition.

Another adjustable vibration dissipating device that can be adjusted by the mere change in the tension of a spring is shown in FIGS. 4–6.

In this device, a support body member 30 is secured to a vibrating structure 31 by means of bolts 32. A pin element 33 is supported in a vertical arm 34 within a block 35 of viscoelastic material. An inertial mass member 37 is supported on a wire 38 held between vertical arm 39 and the pin element 33. A spring 41 is secured at one end to the pin element 33 and at the other end to an adjustable tensioning device 44. A cross-arm 45 is connected between arms 34 and 42 to provide a rigid structure and to provide an attachment for the upper surface of the viscoelastic material 35. In this device, movement of the mass 37 moves the pin 33 to the strained position of the viscoelastic material 35 as shown in FIG. 6. The adjustment of the spring tension by the spring tensioning device 44 adjusts the natural frequency of the vibration energy dissipator.

There is thus provided a vibration energy dissipation device which is capable of having its natural frequency adjusted.

While certain specific embodiments have been described, it is to be understood that numerous changes may be made without departing from the general principles and scope of the invention.

I claim:
1. An adjustable vibration energy dissipating device for dissipating the energy in a vibrating structure comprising: a support body member; means for securing said support body member to said vibrating structure; an inertial mass member; an inertial mass support connected to said inertial mass; a viscoelastic material connected between said inertial mass support and said support body member, said inertial mass support including means for adjusting the natural frequencies of said energy dissipating device.

2. The device as recited in claim 1 wherein said inertial mass support comprises a shaft member threadably connected to said inertial mass; a ball on one end of said shaft; said viscoelastic material being secured in a pocket in said support body member and having a substantially spherical cavity therein for receiving the ball on said shaft; said viscoelastic material being secured by an adhesive to said support body member and said ball on said shaft.

3. The device as recited in claim 1 wherein said viscoelastic material has a pin therein; a wire, supporting said inertial mass member, connected between said pin and a portion of said support body member, said means for adjusting the natural frequencies of said energy dissipating device being an adjustable means connected between the end of said pin remote from said wire and another portion of said support body member.

4. The device as recited in claim 3 wherein said adjusting means is a spring connected between said pin within said viscoelastic material and an adjustable pin held by another portion of said support body member.

5. The device as recited in claim 1 wherein said support body member has three spaced vertical arms, with the viscoelastic material being located within the center arm; a rigid structure connected between two of said vertical arms; a first pin secured in said viscoelastic material; a second pin located in the end arm connected to said rigid structure; a spring connected between said first pin and said second pin for adjusting the tension on said spring; a wire connected between said first pin and the other of said vertical arms; said inertial mass member being supported on said wire.

References Cited
UNITED STATES PATENTS

| | | | |
|---|---|---|---|
| 3,172,630 | 3/1965 | Goodman | 248—20 |
| 3,288,419 | 11/1966 | Wallerstein | 248—358 |
| 3,322,379 | 5/1967 | Flannelly | 248—20 |
| 3,337,165 | 8/1967 | Kondo | 248—15 |

JOHN PETO, *Primary Examiner.*